(12) United States Patent
Oddo

(10) Patent No.: US 8,630,855 B2
(45) Date of Patent: Jan. 14, 2014

(54) CALL SYSTEM AND METHOD

(76) Inventor: Anthony Oddo, Lake Ozark, MO (US)

( * ) Notice: Subject to any disclaimer, the term of this patent is extended or adjusted under 35 U.S.C. 154(b) by 1269 days.

(21) Appl. No.: 12/005,025

(22) Filed: Dec. 21, 2007

(65) Prior Publication Data

US 2008/0154603 A1    Jun. 26, 2008

Related U.S. Application Data

(60) Provisional application No. 60/876,794, filed on Dec. 22, 2006.

(51) Int. Cl.
*G10L 15/00* (2013.01)
*G10L 15/04* (2013.01)
*G10L 21/00* (2013.01)
*G10L 25/00* (2013.01)

(52) U.S. Cl.
USPC .................. 704/251; 704/270; 704/270.1

(58) Field of Classification Search
USPC ...................... 704/231, 251, 270.1
See application file for complete search history.

(56) References Cited

U.S. PATENT DOCUMENTS

| | | | | |
|---|---|---|---|---|
| 6,000,031 A * | 12/1999 | Bingaman et al. | ................. | 726/2 |
| 6,173,279 B1 * | 1/2001 | Levin et al. | ........................ | 704/9 |
| 6,501,832 B1 * | 12/2002 | Saylor et al. | ............... | 379/88.04 |
| 6,658,414 B2 * | 12/2003 | Bryan et al. | ........................... | 1/1 |
| 6,681,008 B2 * | 1/2004 | Bolduc et al. | ................. | 379/222 |
| 7,408,922 B2 * | 8/2008 | Klaghofer | ..................... | 370/352 |
| 7,710,950 B2 * | 5/2010 | Buckley et al. | ............... | 370/354 |
| 7,830,868 B2 * | 11/2010 | Buckley | ........................ | 370/353 |
| 8,051,369 B2 * | 11/2011 | Zirngibl et al. | ............... | 715/201 |
| 2001/0023400 A1 * | 9/2001 | Kurganov et al. | ......... | 704/270.1 |
| 2002/0004721 A1 * | 1/2002 | Cha et al. | ................... | 704/270.1 |
| 2002/0016174 A1 * | 2/2002 | Gibson et al. | ................. | 455/464 |
| 2004/0120480 A1 * | 6/2004 | Didcock et al. | ............ | 379/88.22 |
| 2004/0172254 A1 * | 9/2004 | Sharma et al. | ............. | 704/270.1 |
| 2004/0174864 A1 * | 9/2004 | Klaghofer | ..................... | 370/352 |
| 2005/0141482 A1 * | 6/2005 | Kleiner | ......................... | 370/352 |
| 2006/0168095 A1 * | 7/2006 | Sharma et al. | ................ | 709/217 |
| 2007/0005570 A1 * | 1/2007 | Hurst-Hiller et al. | ............. | 707/3 |
| 2007/0201441 A1 * | 8/2007 | Buckley | ........................ | 370/356 |
| 2009/0019061 A1 * | 1/2009 | Scannell, Jr. | .................... | 707/10 |

\* cited by examiner

*Primary Examiner* — Richemond Dorvil
*Assistant Examiner* — Michael Ortiz Sanchez
(74) *Attorney, Agent, or Firm* — Armstrong Teasdale LLP

(57) ABSTRACT

A system and method for operating a voice domain name network for use over a telephone network including the steps of a computer taking a call in which a user speaks a name. The system recognizes the spoken name. Then the system checks that the name is on a voice domain list stored in a database where the voice domain name corresponds to an Internet URL. The system creating a record registering the name as a voice domain name if the name corresponds to an Internet URL and if it is not previously registered as a voice domain name and wherein said record includes a registrant and a telephone number for the registrant. Such that future callers who call and speak the name are connected via telephone to the registrant.

19 Claims, 4 Drawing Sheets

CALL SYSTEM AND METHOD

RELATED APPLICATIONS

Provisional Application for Patent No. 60/876,794 of Dec. 22, 2006 with the title "Call system" which is hereby incorporated by reference. Applicant claims priority pursuant to 35 U.S.C. Par. 119 (e).

BACKGROUND OF THE INVENTION

In the communications industry it is common to communicate using networks including telephone and computer networks.

U.S. Pat. No. 6,681,008 provides a voice activated telephone system. The patent discloses a system that allows a user to use voice commands to search a phone directory. Prior art systems are limited to a single network such as the phone network.

SUMMARY OF THE INVENTION

The present invention relates to communication across networks wherein a caller can be connected to the registrant of a URL, approved email or a Voice Domain Name.

A system and method for operating a voice domain name network and Internet Registrar for use over a telephone network including the steps of a computer taking a call in which a user speaks a name. The system recognizes the spoken name. Then the system checks that the name is on a voice domain list stored in a database where the name corresponds to an active URL. In order to be registered as a voice domain name the voice domain must be a registered URL on the Internet. The system can create a record registering the name as a voice domain name if the name corresponds to an Internet URL and if it is not previously registered as a voice domain name and wherein the record includes a registrant and a telephone number for the registrant. Such that future callers who call and speak the voice domain name are connected via telephone to a registrant or sub registrant.

These and other advantages of the present invention will become apparent from the detailed description of the invention.

DETAILED DESCRIPTION OF THE DEVICE

Figure 1:
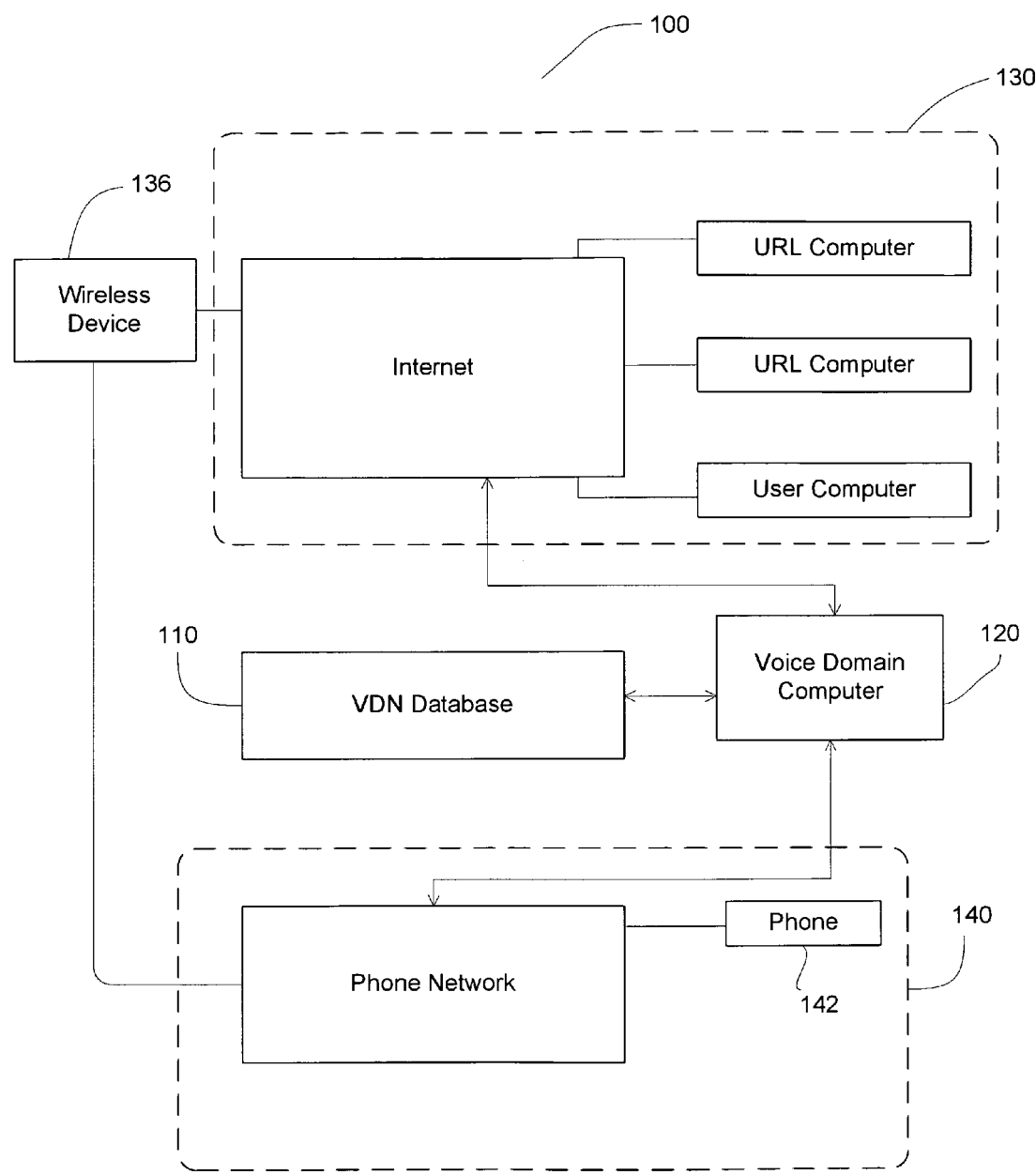
FIG. 1 shows a voice domain network.

In the disclosure the terms (uniform resource locator) URL and web page are used to describe locations on a computer implemented communication network such as the Internet. These locations might be ICANN (Internet Corporation for assigned numbers and names) registered sites, web pages or email for example. FIG. 1 shows a communications network 100. The network 100 includes a voice domain computer 120 and a voice domain database 110 for storing a plurality of voice domain names (VDN). The voice domain computer 120 provides a bridge between two communications networks the Computer Internet 130 and the phone network 140. The Internet 130 is known. The Internet 130 is a computer network that contains many URL computers 132 containing URL addresses for web sites accessible through the Internet 130. The Internet 130 also includes many user computers 134 used by people accessing web pages on URL computers 132 in a way that is well known in the prior art. The Internet 130 is also accessible by some wireless devices 136 including cell phones and PDA's for example.

The communications network 100 also includes a phone network 140. Phone networks are known in the prior art and can include landline phones 142 and wireless devices 136 including cell phones and PDA's. FIG. 1 shows that the voice domain computer 120 provides a bridge between the Internet 130 and the phone network 140.

Figure 2:
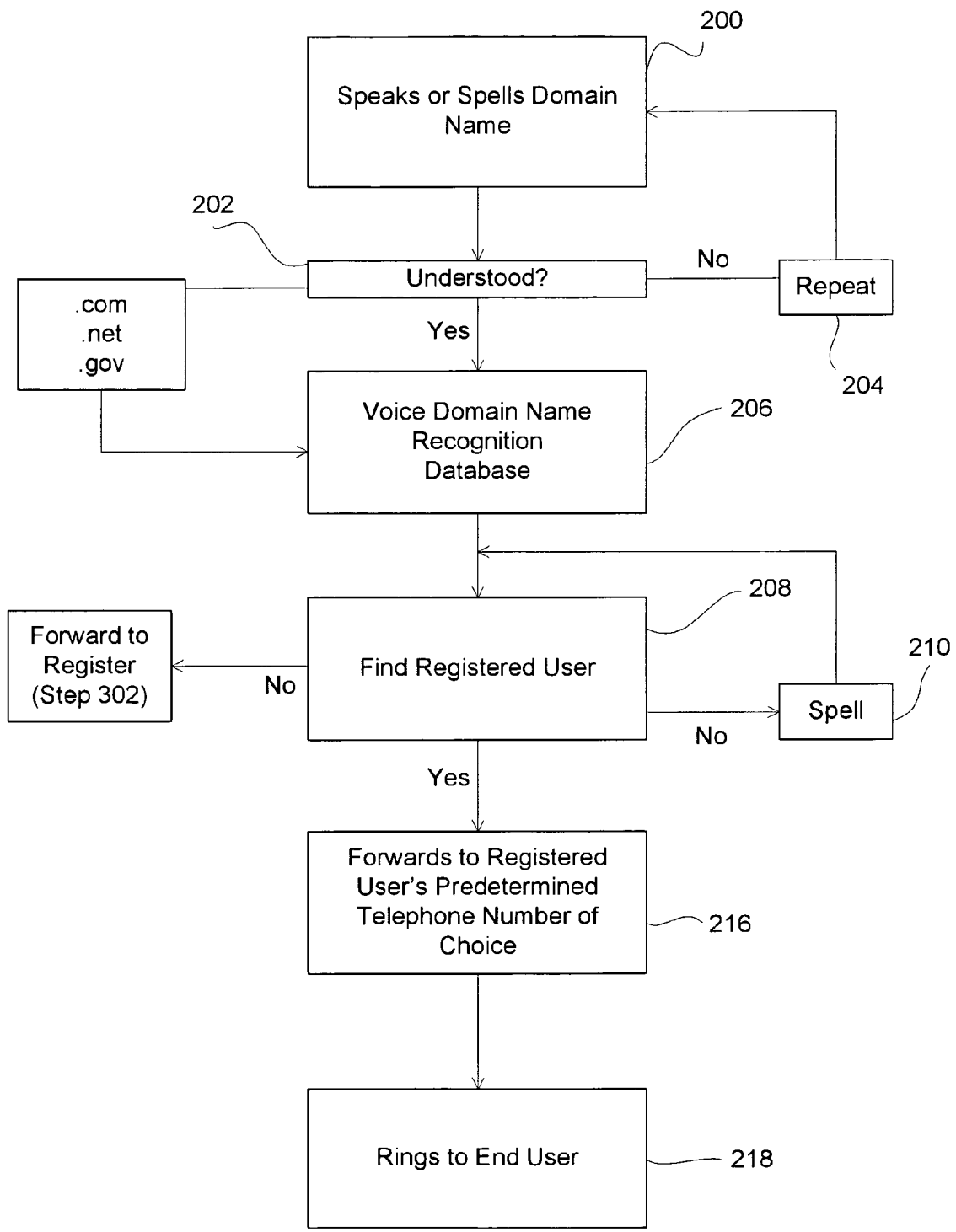
FIG. 2 shows a flow chart of voice domain use.

FIG. 2 shows a flowchart of how the voice domain computer 120 and voice domain database 110 would work from a user perspective. A calling user of the voice domain computer 120 would call the computer 120 using a 1-800 phone number, other toll free number, voice over IP (VOIP), or communication network for example. The calling user might call from a wireless device 136 or a landline phone 142. Once connected to the voice domain computer 120, the calling user would be prompted in step 200 to speak or spell a voice domain name which is a URL from the Internet 130 including the top level domain (.com or .gov for example). For example, the calling user might say, "www.mikeoddo.com" or simply 'mikeoddo.com', the voice domain computer 120 can then check to see if the voice domain name was understood in step 202 by repeating it back to the calling user, if the calling user responds 'no', meaning the repeated voice domain was not the intended voice domain, then the voice domain computer 120 in step 204 can ask the calling user to repeat or spell the voice domain or the voice domain computer 120 could connect the calling user to a live operator if repeated misunderstandings occur. Alternately, the calling user might simply say "Mike Oddo" and the voice domain computer 120 could conduct a search of all upper level domains 205 (Country code top level domains (cctlds), Generic top level domains (gtlds) .com, .net, .gov, .biz etc) and report back those that are taken and those that are available and would then ask the user which they meant. Once understood, the voice domain computer 120 will then access 206 the voice domain database 110 and check to see if the voice domain name spoken and understood is registered. If the voice domain computer 120 finds 208 a registered voice domain name match it will then call through to the phone number associated with the voice domain name and connect the calling user to that phone number and the registrant. If the voice domain computer 120 has understood the voice domain name requested by the calling user but was unable to find it, the voice domain computer 120 can ask the calling user to spell 210 the voice domain name for clarification if they did not do so originally. Alternatively if the voice domain computer 120 found a similar registered name the voice domain computer could state or spell that name to the calling user. If the voice domain name is still not found the calling user is first connected to a message stating that the voice domain name may be available for registration and directing the calling user to a website (see FIG. 4) to register the name and then the calling user can be connected to a live operator to further clarify any questions the calling user may have. The voice domain computer 120 can communicate via any means to produce speech such as a voice synthesizer for example.

Figure 3:
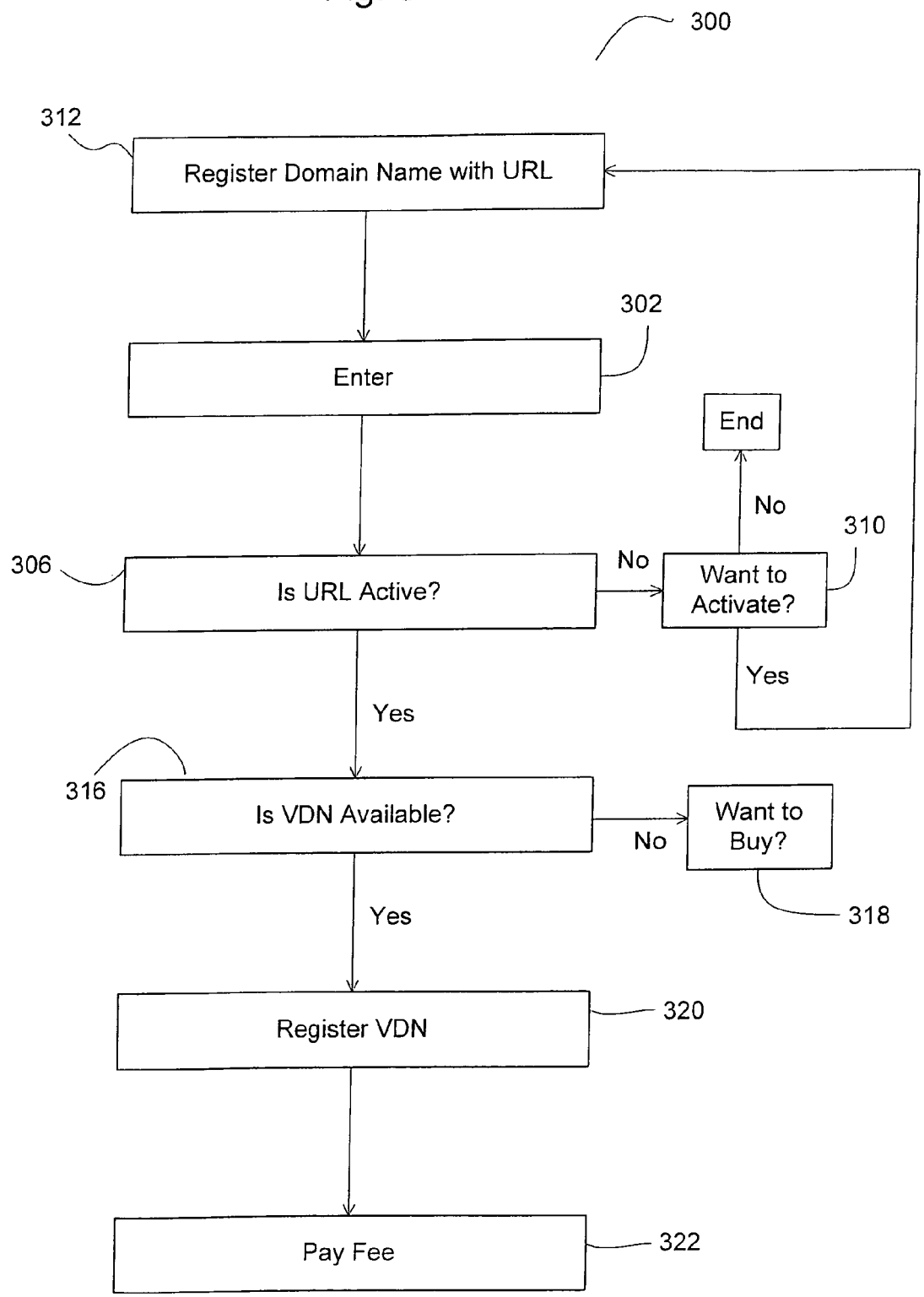
FIG. 3 shows a flow chart of registration of a voice domain.

FIG. 3 shows the process 300 of registering a voice domain name. A URL owner would typically enter the process 300 at step 302. The URL owner is asked if the ICANN registered domain name, approved email or approved internet URL is registered or active 306 on the Internet 130. In addition to asking the system could check the Internet 130 to see if the URL is active on the Internet 130 using a search engine for example. If it is not an ICANN registered domain names, approved email, or approved active URL, then the URL owner is asked if they want to activate and or register 310 the URL on the Internet. If not, then the Voice domain can not be entered and the call will end or the calling user will be connected to a live operator. Only active ICANN registered domain names, approved emails or approved internet URL's on the Internet can be registered as voice domains. If the ICANN registered domain names, approved email, or approved URL owner wants to activate the such by registering them on the Internet 130 then they are directed to a web page (see FIG. 4) to complete Domain name registration on the Internet 312. For example, the ICANN registered domain name, approved email or approved URL owner could be given a website address and the owner could open the website while on the phone or they could hang up and go to the website to complete the process of registering the ICANN registered domain name, approved email, or approved URL on the Internet. Once the URL is active 306 then the voice domain computer 120 checks to see if the voice domain name (VDN) is available 316. If the voice domain name is already owned then the ICANN registered domain name, approved email, or approved URL owner is asked if they are interested in buying 318 the VDN from its current owner. It is possible for the owner of a domain name on the Internet 130 to not be the owner of the corresponding voice domain name. If the URL is active 306 and the VDN is available to register 316 then the URL can be registered 320 as a Voice domain name (VDN). A fee can then be paid 322.

Figure 4:
FIG. 4 shows a screen shot of the voice domain registration website

FIG. 4 shows a screen shot of the web page 400 used to register voice domain names. The prospective registrant wishing to register a voice domain name can enter the name in box 402. The voice domain computer 120 will check the name in box 402 against the names already in the voice domain database 110. The web page 400 can also include the ability to register a URL on the Internet. If the entered name is not yet registered, then it can be registered by paying a fee and the prospective registrant would become the registrant and their name and phone number would be entered and associated with the voice domain name in a record stored in the VDN database 110. If the VDN is already registered and the Internet domain name is also registered then the prospective registrant could be given the option to buy or lease the VDN if it is available. This could be done by putting the prospective registrant in contact with the actual previous registrant or by automation.

The invention claimed is:

1. A computer implemented method for operating a voice domain name network for use over a voice telephone network including the steps of:
   taking a call over the voice telephone network in which a first caller speaks a name;
   recognizing the name spoken by the first caller;
   determining whether the name is on a voice domain name list stored in a computer and determining whether the name corresponds to an Internet URL;
   upon determining that the name corresponds to the Internet URL and that the name is not in the list, creating, based on the name, a record on the list in the computer, registering the name as a first voice domain name, wherein the record includes a listing for a registrant, the listing including a telephone number associated with the registrant and the first voice domain name;
   wherein a second caller who calls and speaks the first voice domain name is connected via the voice telephone network to the telephone number associated with the registrant of the Internet URL;
   wherein the step of determining whether the name corresponds to an Internet URL includes the steps of:
   searching for the Internet URL on the Internet and then;
   generating a voice offering over the voice telephone network to register the Internet URL for the first caller if the Internet URL is found to be unregistered and then registering the Internet URL as a domain name on the Internet.

2. The method of claim 1 wherein the step of searching includes searching for the domain name in at least one top level domain and reporting over the voice telephone network to the first caller the availability of the domain name in the at least one top level domain.

3. The method of claim 1 wherein said step of determining whether the name is on a voice domain name list stored in the computer includes connecting over the voice telephone network, the first caller to the registrant if the name is on the voice domain name list stored in the computer.

4. The method of claim 1 wherein the step of recognizing the name includes the step of the computer asking the first caller to spell the name.

5. A computer system for operating a voice domain name network for use over a telephone network including:
   a voice domain computer having voice recognition capability to take a call from a first caller over telephone network and to recognize a name spoken in the call;
   a database connected to said computer, said database containing a plurality of voice domain names wherein each voice domain name in said database includes a corresponding Internet URL and telephone number associated with a registrant of the Internet URL, wherein the voice domain names in said database are entered into the database from voice information;
   a search engine configured to search for a specific voice domain name in the plurality of voice domain names and to search the Internet for an Internet URL in response to the call and to perform a telephone routine to connect the call to the telephone number associated with the registrant;
   means for offering to register the Internet URL by voice through the telephone network if said search engine fails to find the specific voice domain;
   means for generating a voice offer over the telephone network to register the Internet URL for the first caller if the Internet URL is found to be unregistered on the Internet and then registering the Internet URL as a domain name on the Internet and as the specific voice domain name in said database.

6. The system of claim 5 wherein said voice domain computer automatically secures the Internet URL on the Internet prior to registering the specific voice domain and recording the telephone number of the registrant in said database.

7. The system of claim 5, further comprising means for offering to sell the specific voice domain to the first caller.

8. The system of claim 5, further comprising means for spelling at least one voice domain name in the plurality of voice domain names in said database to the first caller.

9. The system of claim 5, further comprising means for stating at least one voice domain name in the plurality of voice domain names in said database to the first caller.

10. The system of claim 8, wherein the at least one voice domain name is not the specific voice domain name.

11. The system of claim 9, wherein the at least one voice domain name is not the specific voice domain name.

12. The system of claim 5, further comprising means for determining that the name spoken by the first caller is similar to but not the same as at least one voice domain name in said database and stating or spelling the at least one voice domain name to the first caller.

13. The system of claim 5, further comprising means for connecting the first caller to a live operator.

14. A computer implemented method for operating a voice domain name network for use over a telephone communication network including the steps of:
 receiving a call over the telephone communication network in which a first caller speaks a name,
 recognizing the name spoken by the first caller;
 determining whether the name is on a voice domain name list stored in a computer and determining whether the name corresponds to an Internet URL;
 upon determining that the name corresponds to an Internet URL and that the name is not on the list, creating a record in the computer registering the name as a voice domain name, wherein the record includes contact information for a registrant including a telephone number associated with the registrant of the Internet URL,
 wherein a second caller on the telephone network who calls and speaks the voice domain name is connected via the telephone communication network to the telephone number associated with the registrant and wherein the step of determining whether the name corresponds to an Internet URL includes the step of:
 searching for the Internet URL on the Internet and then;
 generating a voice offering over the telephone network to register the Internet URL on the Internet for the first caller if the Internet URL is found to be unregistered and then registering the Internet URL as a domain name on the Internet.

15. The method of claim 14 wherein the step of searching for the Internet URL includes the step of placing the caller on hold while searching for the domain name.

16. The method of claim 14 wherein said step of generating the voice offering includes instructing the first caller to connect to an Internet website where the Internet URL can be registered.

17. The method of claim 16 wherein the step of generating the voice offering includes searching for the Internet URL on the Internet and reporting to the first caller the availability of the domain name in a top level domain.

18. The method of claim 17 wherein said step of determining whether the name is on a voice domain name list stored in the computer includes connecting the first caller to the registrant if the name is on the voice domain name list.

19. The method of claim 18 wherein the step of recognizing the name spoken by the first caller includes the step of the computer asking the first caller to spell the name.

\* \* \* \* \*